(12) United States Patent
Bohnengel

(10) Patent No.: US 6,817,110 B2
(45) Date of Patent: Nov. 16, 2004

(54) MEASURING TAPE SYSTEM

(75) Inventor: Andrew C. Bohnengel, Sylvania, OH (US)

(73) Assignee: The Perfect Measuring Tape Company, Toledo, OH (US)

( * ) Notice: Subject to any disclaimer, the term of this patent is extended or adjusted under 35 U.S.C. 154(b) by 0 days.

(21) Appl. No.: 10/161,200

(22) Filed: Jun. 3, 2002

(65) Prior Publication Data

US 2002/0184779 A1 Dec. 12, 2002

Related U.S. Application Data

(60) Provisional application No. 60/296,271, filed on Jun. 6, 2001.

(51) Int. Cl.[7] .............................................. G01B 3/10
(52) U.S. Cl. ................... 33/555.4; 33/555.1; 33/755; 33/759; 33/770; 33/511
(58) Field of Search ................... 33/555.1, 511–512, 33/555.4, 755–761, 767–770, 514.1, 781

(56) References Cited

U.S. PATENT DOCUMENTS

| | | | |
|---|---|---|---|
| 421,133 A | | 2/1890 | Grierson |
| 2,129,582 A | | 9/1938 | Johansson |
| 2,262,664 A | | 11/1941 | Bresson |
| 3,639,995 A | | 2/1972 | Gardner |
| 3,918,166 A | | 11/1975 | Mason |
| 3,965,579 A | | 6/1976 | Woods |
| 4,473,949 A | | 10/1984 | Schechtman |
| 4,641,433 A | * | 2/1987 | Sing .............................. 33/770 |
| 4,688,653 A | | 8/1987 | Ruble |
| 4,691,539 A | | 9/1987 | Gover |
| 5,042,159 A | * | 8/1991 | Millen ........................... 33/414 |
| 5,062,215 A | * | 11/1991 | Schlitt ........................... 33/755 |
| 5,174,030 A | | 12/1992 | Clot et al. |
| 5,193,287 A | | 3/1993 | Coulter et al. |
| 5,367,785 A | | 11/1994 | Benarroch |
| 5,371,949 A | * | 12/1994 | Delaurier ...................... 33/755 |
| 5,414,943 A | | 5/1995 | Vogt |
| 5,567,514 A | | 10/1996 | Gold |
| 5,600,894 A | * | 2/1997 | Blackman et al. ............. 33/758 |
| 5,613,302 A | | 3/1997 | Berman et al. |
| 5,809,661 A | | 9/1998 | Brown |
| 5,873,174 A | | 2/1999 | Kraft |
| 6,047,481 A | | 4/2000 | Bond |
| 6,053,447 A | * | 4/2000 | Omri ............................ 33/770 |
| 6,134,801 A | * | 10/2000 | Miyasaka ...................... 33/767 |
| 6,357,133 B1 | * | 3/2002 | Hsu ............................. 33/755 |
| 6,494,014 B2 | * | 12/2002 | Lafrance ....................... 33/758 |
| 6,499,226 B1 | * | 12/2002 | Reda et al. .................... 33/771 |

* cited by examiner

*Primary Examiner*—Diego Gutierrez
*Assistant Examiner*—Yaritza Guadalupe
(74) *Attorney, Agent, or Firm*—Fraser Martin; Buchanan Miller LLC; Donald R. Fraser

(57) ABSTRACT

A measuring tape system for determining the girth or length of an object, the measuring tape system including a flexible tape containing specific measuring indicia. One end of the flexible tape is secured to and wound about a drum rotatably mounted within a housing. The drum is spring biased such that it will allow the associated tape to be paid out against the bias of the spring and upon the appropriate command is retrieved and rewound on the drum. The flexible tape is pulled from the housing through an appropriate opening in the wall of the housing and the free end of the tape is selectively placed in a receiver formed in the housing.

17 Claims, 2 Drawing Sheets

MEASURING TAPE SYSTEM

CROSS-REFERENCE TO RELATED APPLICATION

This application claims the benefit of U.S. provisional patent application Ser. No. 60/296,271, filed Jun. 6, 2001.

FIELD OF THE INVENTION

The present invention relates to a measuring tape system, and more particularly to a measuring tape system for determining the girth or length of an object. The system includes a flexible tape containing specific measuring indicia wherein one end of the flexible tape is secured to and wound about a drum rotatably mounted within a housing and the free end of the tape is releasably placed in a receiver formed in the housing.

DESCRIPTION OF THE PRIOR ART

Various systems have been designed for measuring the girth or circumference of objects. Such a prior art system is illustrated and described in U.S. Pat. No. 2,129,582. The apparatus disclosed utilizes a spring biased tape forming a loop. The end of the tape opposite that which is attached to a rotatably mounted drum is permanently attached to the housing.

U.S. Pat. No. 2,262,664 discloses a tape having a U-shaped member secured at one end thereof. The U-shaped member slidingly receives the tape therein to permit measurement of a circumference of an object.

U.S. Pat. No. 5,367,785 shows a locking device having measurement indicia on an extendable length of material to be used as a measuring device. The extendable length of material includes a rigid T-shaped terminal end.

It would be desirable to produce a measuring tape system for measuring the girth or length of an object which is easily wrapped around the object, cinches to a precise measurement of the girth, and is easy to use.

SUMMARY OF THE INVENTION

Consistent and consonant with the present invention, a measuring tape system for measuring the girth or length of an object which is easily wrapped around the object, cinches to a precise measurement of the girth, and is easy to use has surprisingly been discovered.

The measuring tape system for measuring the circumference or girth of an object comprises: a housing having a hollow main body portion and a handle portion, the hollow main body portion having a tape outlet opening and a spaced apart cavity; a spring biased drum rotatably mounted within the housing; a flexible tape with measuring indicia disposed on at least one side thereof, the tape having a first end attached to the drum and a second end extending through the tape outlet opening of the main body portion of the housing; an end piece mounted on the second end of the tape which is adapted to be selectively received by and retained within the cavity formed in the main body portion of the housing, the end piece having a configuration distinct from the configuration of the tape outlet opening of the housing thereby militating against the end piece from entering the housing; and means for selectively unlocking and locking the drum to allow the tape to be coiled and uncoiled respectively whereby the coiling of the tape will cause the tape to tightly surround the object.

BRIEF DESCRIPTION OF THE DRAWINGS

The above, as well as other objects, features, and advantages of the present invention will be understood from the detailed description of the preferred embodiments of the present invention with reference to the accompanying drawings, in which.

DETAILED DESCRIPTION OF THE PREFERRED EMBODIMENT

Figure 1:
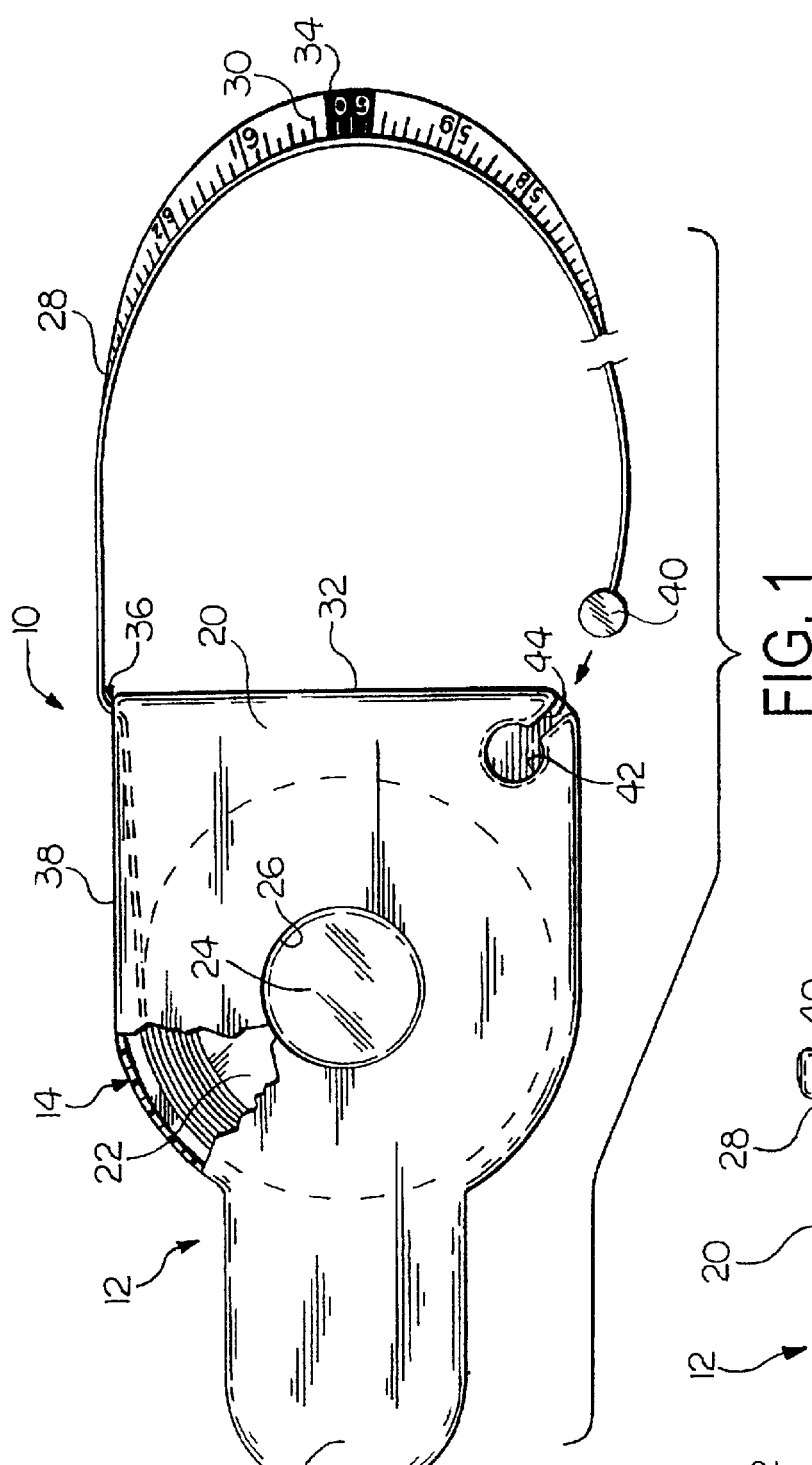
FIG. 1 is a top plan view of an embodiment of the invention showing the measuring tape in an extended position out of the housing and with a portion of the housing cutaway to show an interior tape drum.
Figure 2:
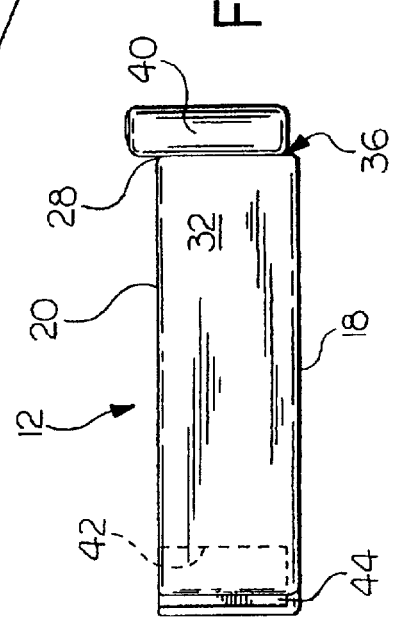
FIG. 2 is a right hand end view of the device illustrated in FIG. 1 with the flexible tape being coiled completely within the associated housing.

Referring now to the drawings, and particularly FIG. 1, there is shown generally at 10 a measuring tape system incorporating the features of the invention. The measuring tape system 10 provides a means for measuring the circumference or girth and length of an object such as a package, for example. The measuring tape system 10 includes a housing 12, having a hollow main body portion 14 and an associated handle portion 16. In the embodiment shown, the handle portion 16 is shown as having a smooth and rounded outer surface. It is understood that other handle configurations could be used such as one having a grip portion formed to fit a hand of a user with individual finger depressions, for example. The housing 12 includes a generally flat planar bottom surface 18 and a generally flat planar top surface 20, as illustrated in FIG. 2.

A spring biased measuring tape rotary storage drum or spool 22 is disposed within the hollow interior of the hollow main body portion 14. A wound spring, for example, is typically used to bias the drum 22, but it is understood that other spring types could be used without departing from the scope and spirit of the invention. The spring biased drum 22 can be any conventionally available drum such as that commercially available from Giantdragon, for example. The drum 22 is rotatably mounted within the housing 12. A retractor button 24 is disposed within an aperture 26 formed in the top surface 20 of the housing 12 and is operative to effectively retract a ratchet (not shown but well known in the art) associated with the drum 22 as will be explained in greater detail hereinafter. It is understood that other retractor mechanisms could be used such as a finger trigger, for example, without departing from the scope and spirit of the invention.

One end of a flexible tape 28 with measuring indicia 30 imprinted thereon is attached to the drum 22. The measuring indicia 30 can be printed on both sides of the tape 28. At least one side of the tape 28 has indicia which includes the length of an end wall 32 of the hollow main body portion 14. The second side of the tape 28 may include indicia 30 which begins at zero to be used for length measurements. In the embodiment shown, secondary indicia 34 is included on the tape 28. The tape 28 is wound or coiled about an outer circumference of the drum 22.

The free end of the tape 28 is caused to pass through a tape outlet 36 formed in a sidewall 38 of the housing 12. The free end of the tape 28 is provided with an end piece 40 in the form of a cylindrical peg which functions to prohibit the free end of the tape 28 from traveling through the outlet 36, and also is selectively receivable with a cylindrical cavity 42 formed in the housing 12 in spaced relation from the outlet 36. The cylindrical cavity 42 is provided with a slot 44 which receives the tape 28 adjacent the end piece 40.

Figures 3, 4:
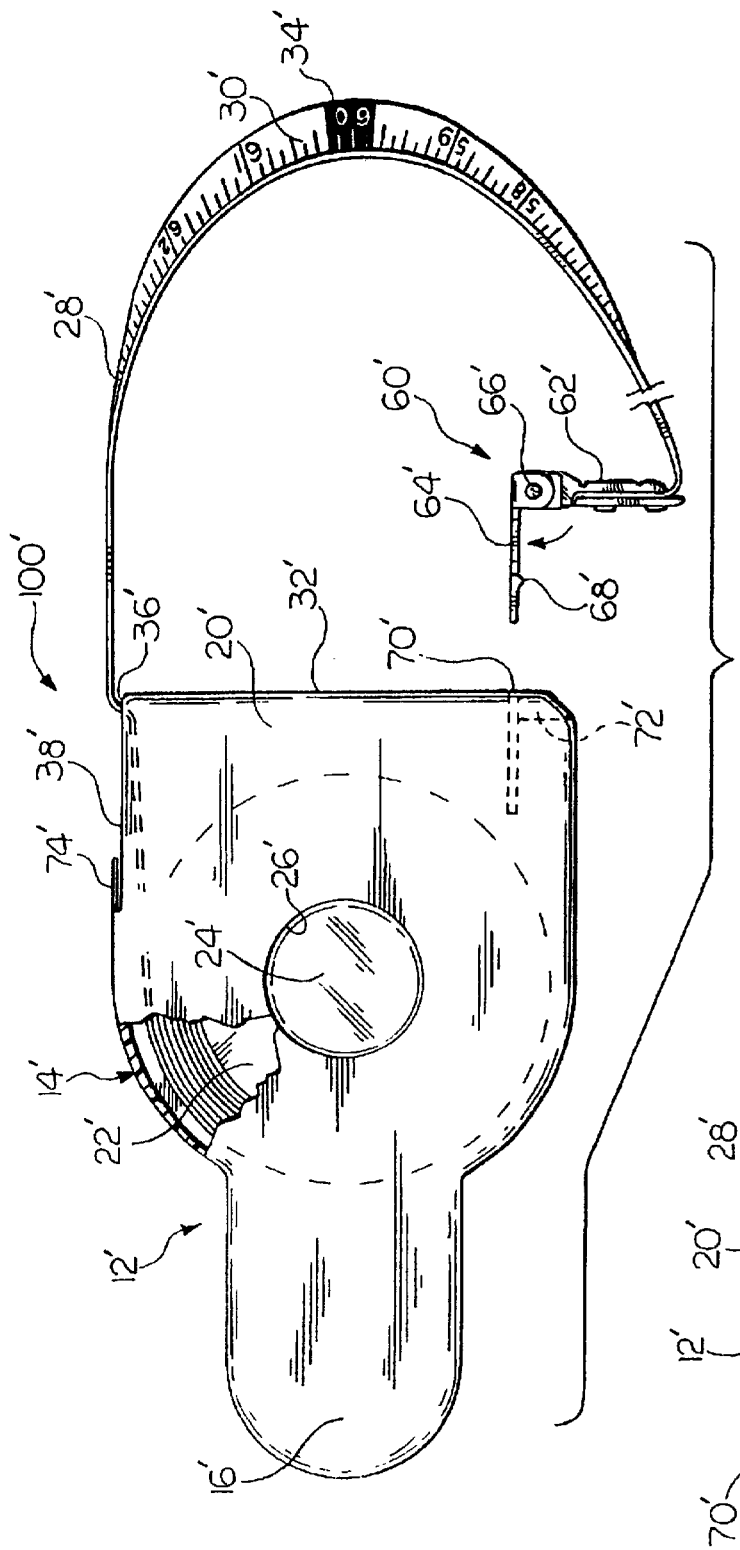
FIG. 3 is a top plan view of an alternate embodiment of the invention showing the measuring tape in an extended position out of the housing and with a portion of the housing cutaway to show an interior tape drum.
FIG. 4 is a right hand end view of the device illustrated in FIG. 3 with the flexible tape being coiled completely within the associated housing.

A second embodiment of the invention is illustrated in FIGS. 3 and 4. Referring now to FIG. 3, a measuring tape system 100' is shown which includes a housing 12', having a hollow main body portion 14' and an associated handle portion 16'. In the embodiment shown, the handle portion 16' is shown as having a smooth and rounded outer surface. It is understood that other handle configurations could be used such as one having a grip portion formed to fit a hand of a user with individual finger depressions, for example. The housing 12' includes a generally flat planar bottom surface 18' and a generally flat planar top surface 20', as illustrated in FIG. 4.

A spring biased measuring tape rotary storage drum or spool 22' is disposed within the hollow interior of the hollow main body portion 14'. A wound spring, for example, is typically used to bias the drum 22', but it is understood that other spring types could be used without departing from the scope and spirit of the invention. The spring biased drum 22' can be any conventionally available drum such as that commercially available from Giantdragon, for example. The drum 22' is rotatably mounted within the housing 12'. A retractor button 24' is disposed within an aperture 26' formed in the top surface 20' of the housing 12' and is operative to effectively retract a ratchet (not shown but well know in the art) associated with the drum 22' as will be explained in greater detail hereinafter. It is understood that other retractor mechanisms could be used such as a finger trigger, for example, without departing from the scope and spirit of the invention.

One end of a flexible tape 28' with measuring indicia 30' imprinted thereon is attached to the drum 22'. The measuring indicia 30' can be printed on both sides of the tape 28'. At least one side of the tape 28' has indicia which includes the length of an end wall 32' of the hollow main body portion 14'. The second side of the tape 28' may include indicia 30' which begins at zero to be used for length measurements. In the embodiment shown, secondary indicia 34' is included on the tape 28'. The tape 28' is wound or coiled about an outer circumference of the drum 22'.

The free end of the tape 28' is caused to pass through a tape outlet 361 formed in a side wall 38' of the housing 12'. The free end of the tape 28' is provided with an end latch 60'. The end latch 60' prohibits the free end of the tape 28' from traveling through the outlet 36'. The end latch 60' comprises a main body 62' and an end tab 64' which is connected to the main body 62' by a hinge 66'. A plurality of projections 68' are formed on one side of the end tab 64' The end tab 64' of the end latch 60' is adapted to be received in a slot 70' formed in the end wall 32'. A depression 72' formed in the housing 12' receives the main body 62' to maintain a generally planar surface on the end wall 32' A protuberance 74' receives the end latch 60' to store the end latch 60' when not in use.

The operation of embodiments of the invention will now be described. A common use for the invention illustrated in the drawings is to measure the girth of a package to determine mailing or handling costs. In the embodiment of FIGS. 1 and 2, when it is desired to measure the girth of a package, the tape 28 is pulled out from the housing 12 in sufficient length to wrap around the girth of the package. The girth is typically defined as twice the width plus twice the breadth of the package. The length of the package is typically defined as the longest dimensional side of the package.

After the tape 28 is wrapped around the girth of the package being measured, the end piece 40 is inserted into the cylindrical cavity 42. At this stage of the measuring operation, it is important that the tape 28 does not become twisted.

In order to assure an accurate measurement, the retract button 24 is depressed inwardly of the housing 12 to release the ratchet which permits the drum 22 to rotate in a direction to retract the tape 28 and causes the tape 28 to tighten around the associated package. At this stage the end wall 32 of the housing 12 must be resting against the surface of the package being measured to ensure an accurate measurement. In the embodiment shown, the measuring tape system 10 is ideally used with a package having at least one flat surface, against which the end wall 32 is caused to rest. It is understood that a differently shaped end wall 32 could be used such as arcuate, for example, without departing from the scope and spirit of the invention.

Typically the girth measurement indicia appears on the face of the tape 28 at the outlet 36 where the tape 28 emerges from the housing 12. The position is then marked by holding the tape 28 between the thumb and forefinger of the operator. The holding of the tape 28 in this manner permits an additional length of tape 28 to be pulled out of the housing 12 to measure the length of the package. During the latter step, the end piece 40 is allowed to remain in the cylindrical cavity 42.

The total or sum of the two measurements (girth and length) is used to indicate the appropriate package classification which is categorized by use of the secondary indicia 34 on the face of the tape 28. Depending upon the particular size and the categorization of a package by a particular shipper, the designation of category may be Standard, Additional Handling, OS1 (oversized class 1), OS2 (oversized class 2), or Maximum, for example, and shipping or handling costs may be determined The other face of the tape 28 may contain a scale for linear measurements with the idicia starting at zero.

In the embodiment of FIGS. 3 and 4, when it is desired to measure the girth of a package, end latch 60' is removed from the protuberance 74' the end tab 64' is rotated 90 degrees to cause the end latch 60' to form an L-shape, and the tape 28' is pulled out from the housing 12' in sufficient length to wrap around the girth of the package. The girth is typically defined as twice the width plus twice the breadth of the package. The length of the package is typically defined as the longest dimensional side of the package.

After the tape 28' is wrapped around the girth of the package being measured, the end tab 64' of the end latch 60' is inserted into the slot 70' until the main body 62' is received in the depression 72'. At this stage of the measuring operation, it is important that the tape 28' does not become twisted.

In order to assure an accurate measurement, the retract button 24' is depressed inwardly of the housing 12' to release the ratchet which permits the drum 22' to rotate in a direction to retract the tape 28' and causes the tape 28' to tighten around the associated package. At this stage the end wall 32' of the housing 12' must be resting against the surface of the package being measured to ensure an accurate measurement. In the embodiment shown, the measuring tape system 100' is ideally used with a package having at least one flat surface, against which the end wall 32' is caused to rest. It is understood that a differently shaped end wall 32' could be used such as arcuate, for example, without departing from the scope and spirit of the invention.

Typically the girth measurement indicia appears on the face of the tape 28' at the outlet 36' where the tape 28' emerges from the housing 12'. The position is then marked by holding the tape 28' between the thumb and forefinger of the operator. The holding of the tape 28' in this manner permits an additional length of tape 28' to be pulled out of the housing 12' to measure the length of the package. During the latter step, the end latch 60' is allowed to remain in the slot 70'.

The total or sum of the two measurements (girth and length) is used to indicate the appropriate package classification which is categorized by use of the secondary indicia 34' on the face of the tape 28'. Depending upon the particular size and the categorization of a package by a particular shipper, the designation of category may be Standard, Additional Handling, OS1 (oversized class 1), OS2 (oversized class 2), or Maximum, for example, and shipping or handling costs may be determined.

The other face of the tape 28' may contain a scale for linear measurements with the idicia starting at zero. In the embodiments of FIGS. 3 and 4, long linear measurements can be obtained by one person without the assistance of another person. The end latch 60' is placed over the corner of the package and the projections 68' militate against the end latch 60' slipping off of the package. The user then reads the length measurement from the tape 28'. When not in use, the end tab 64' is rotated 90 degrees to be essentially adjacent and flush with the main body 62' and the end latch 60' is engaged with the protuberance 74'.

It will be understood that other indicia could be substituted for the indicia noted above without departing from the overall inventive concept.

From the foregoing description, one ordinarily skilled in the art can easily ascertain the essential characteristics of this invention and, without departing from the spirit and scope thereof, can make various changes and modifications to the invention to adapt it to various usages and conditions. For example, a belt clip could be added for temporary storage of the measuring tape system when the user is attending to other tasks.

What is claimed is:

1. A measuring tape system for measuring a girth of an object, comprising:
    a housing having a hollow main body portion with an endwall adapted for contacting the object, a first sidewall generally perpendicular to and extending from the endwall, a second sidewall generally perpendicular to and extending from the endwall and parallel to the first sidewall, a tape outlet opening in the first sidewall, the tape outlet opening adjacent the intersection of the endwall and first sidewall, and a cavity proximate the intersection of the endwall and the second sidewall;
    a spring biased drum rotatably mounted within said housing;
    a flexible tape with measuring indicia disposed on at least one side thereof, said tape having a first end attached to said drum and a second end extending through the tape outlet opening of the main body portion of said housing;
    an end piece mounted on the second end of said tape which is adapted to be selectively received by and retained within the cavity formed in the main body portion of said housing, said end piece having a configuration distinct from the configuration of the tape outlet opening of said housing thereby militating against said end piece entering said housing; and
    means for selectively unlocking and locking said drum to allow said tape to be coiled and uncoiled respectively whereby the coiling of said tape will cause said tape to tightly surround the object.

2. The measuring tape system according to claim 1, wherein said end piece is a cylindrical peg.

3. The measuring tape system according to claim 1, wherein said end piece is an end latch, said end latch having a main body and an end tab portion hingedly disposed on the main body, the end tab portion of said end latch is adapted to be selectively received by and retained within the cavity formed in the main body portion of said housing.

4. The measuring tape system according to claim 3, wherein said housing has a depression formed therein which is adapted to receive the main body of said end latch when the end tab portion of said end latch is inserted into the cavity formed in the main body portion of said housing.

5. The measuring tape system according to claim 3, wherein the main body portion of said housing includes a protuberance formed thereon to releasably retain said end latch when the tape is not in use.

6. The measuring tape system according to claim 1, wherein said tape includes measuring indicia for measuring a girth of the object and a measuring indicia for measuring a length of the object, wherein the idicia for measuring the girth of the object has a scale which begins at a quantity equal to zero plus a width of said housing, and wherein the indicia for measuring the length of the object has a scale which begins at zero.

7. The measuring tape system according to claim 1, wherein said tape includes a secondary indicia for categorizing the object.

8. A measuring tape system for measuring a girth of an object, comprising:
    a housing having a hollow main body portion with an endwall adapted for contacting the object, a first sidewall generally perpendicular to and extending from the endwall, a second sidewall generally perpendicular to and extending from the endwall and parallel to the first sidewall, a tape outlet opening in the first sidewall, the tape outlet opening adjacent the intersection of the endwall and first sidewall, and a cavity proximate the intersection of the endwall and the second sidewall;
    a spring biased drum rotatably mounted within said housing;
    a flexible tape with measuring indicia disposed on at least one side thereof, said tape having a first end attached to said drum and a second end extending through the tape outlet opening of the main body portion of said housing;
    a cylindrical peg mounted on the second end of said tape which is adapted to be selectively received by and retained within the cavity formed in the main body position of said housing, said peg having a configuration distinct from the configuration of the tape outlet opening of said housing thereby militating against said peg entering said housing; and
    means for selectively unlocking and locking said drum to allow said tape to be coiled and uncoiled respectively whereby the coiling of said tape will cause said tape to tightly surround the object.

9. The measuring tape system according to claim 8, wherein said housing includes a handle portion.

10. The measuring tape system according to claim 8, wherein said tape includes measuring indicia for measuring a girth of the object and a measuring indicia for measuring a length of the object, wherein the idicia for measuring the girth of the object has a scale which begins at a quantity equal to zero plus a width of said housing, and wherein the indicia for measuring the length of the object has a scale which begins at zero.

11. The measuring tape system according to claim 8, wherein said tape includes a secondary indicia for categorizing the object.

12. A measuring tape system for measuring a girth of an object, comprising:

a housing having a hollow main body portion with an endwall adapted for contacting the object, a first sidewall generally perpendicular to and extending from the endwall, a second sidewall generally perpendicular to and extending from the endwall and parallel to the first sidewall, a tape outlet opening in the first sidewall, the tape outlet opening adjacent the intersection of the endwall and first sidewall, and a cavity proximate the intersection of the endwall and the second sidewall;

a spring biased drum rotatably mounted within said housing;

a flexible tape with measuring indicia disposed on at least one side thereof, said tape having a first end attached to said drum and a second end extending through the tape outlet opening of the main body portion of said housing;

an end latch mounted on the second end of said tape, said end latch having a main body and an end tab portion hingedly disposed on the main body, the end tab portion of said end latch is adapted to be selectively received by and retained within the cavity formed in the main body portion of said housing, said end latch having a configuration distinct from the configuration of the tape outlet opening of said housing thereby militating against said end latch entering said housing; and means for selectively unlocking and locking said drum to allow said tape to be coiled and uncoiled respectively whereby the coiling of said tape will cause said tape to tightly surround the object.

13. The measuring tape system according to claim 12, wherein said housing includes a handle portion.

14. The measuring tape system according to claim 12, wherein said tape includes measuring indicia for measuring a girth of the object and a measuring indicia for measuring a length of the object, wherein the idicia for measuring the girth of the object has a scale which begins at a quantity equal to zero plus a width of said housing, and wherein the indicia for measuring the length of the object has a scale which begins at zero.

15. The measuring tape system according to claim 12, wherein said housing has a depression formed therein which is adapted to receive the main body of said end latch when the end tab portion of said end latch is inserted into the cavity formed in the main body portion of said housing.

16. The measuring tape system according to claim 12, wherein the main body portion of said housing includes a protuberance formed thereon to releasably retain said end latch when the tape is not in use.

17. The measuring tape system according to claim 12, wherein said tape includes a secondary indicia for categorizing the object.

* * * * *